July 31, 1956  F. RIEBER  2,756,836
GEOPHYSICAL DISPLAY APPARATUS
Original Filed Dec. 17, 1948  5 Sheets-Sheet 1

INVENTOR,
FRANK RIEBER,
DECEASED;
LU GARDA RIEBER,
EXECUTRIX
BY Lippincott & Smith
ATTORNEYS

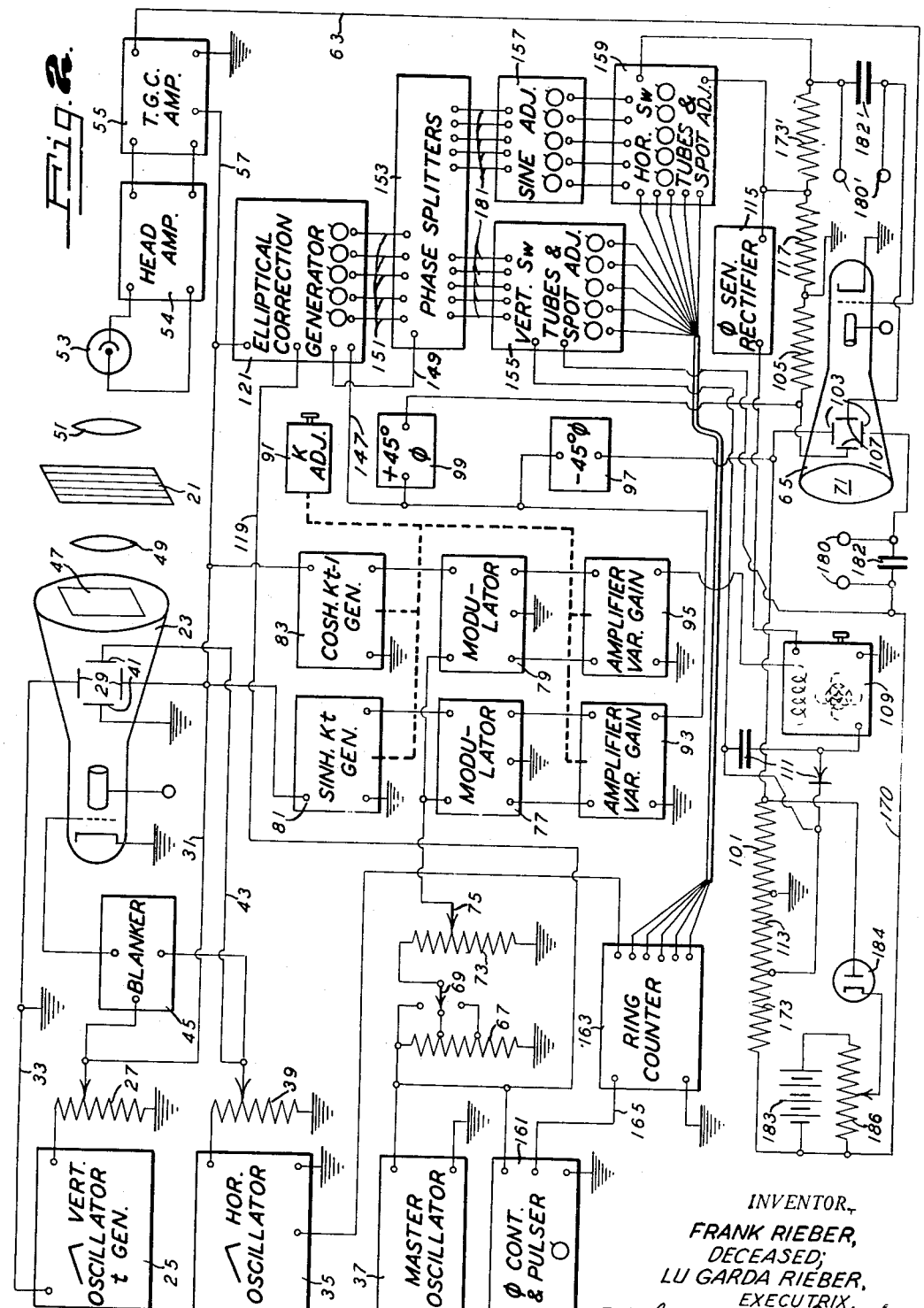

July 31, 1956  F. RIEBER  2,756,836
GEOPHYSICAL DISPLAY APPARATUS
Original Filed Dec. 17, 1948  5 Sheets—Sheet 3

INVENTOR,
FRANK RIEBER,
DECEASED;
LU GARDA RIEBER,
EXECUTRIX.
BY Lippincott & Smith
ATTORNEYS INVENTOR,
FRANK RIEBER,
DECEASED;
LU GARDA RIEBER,
EXECUTRIX
BY Lippincott & Smith.
ATTORNEYS

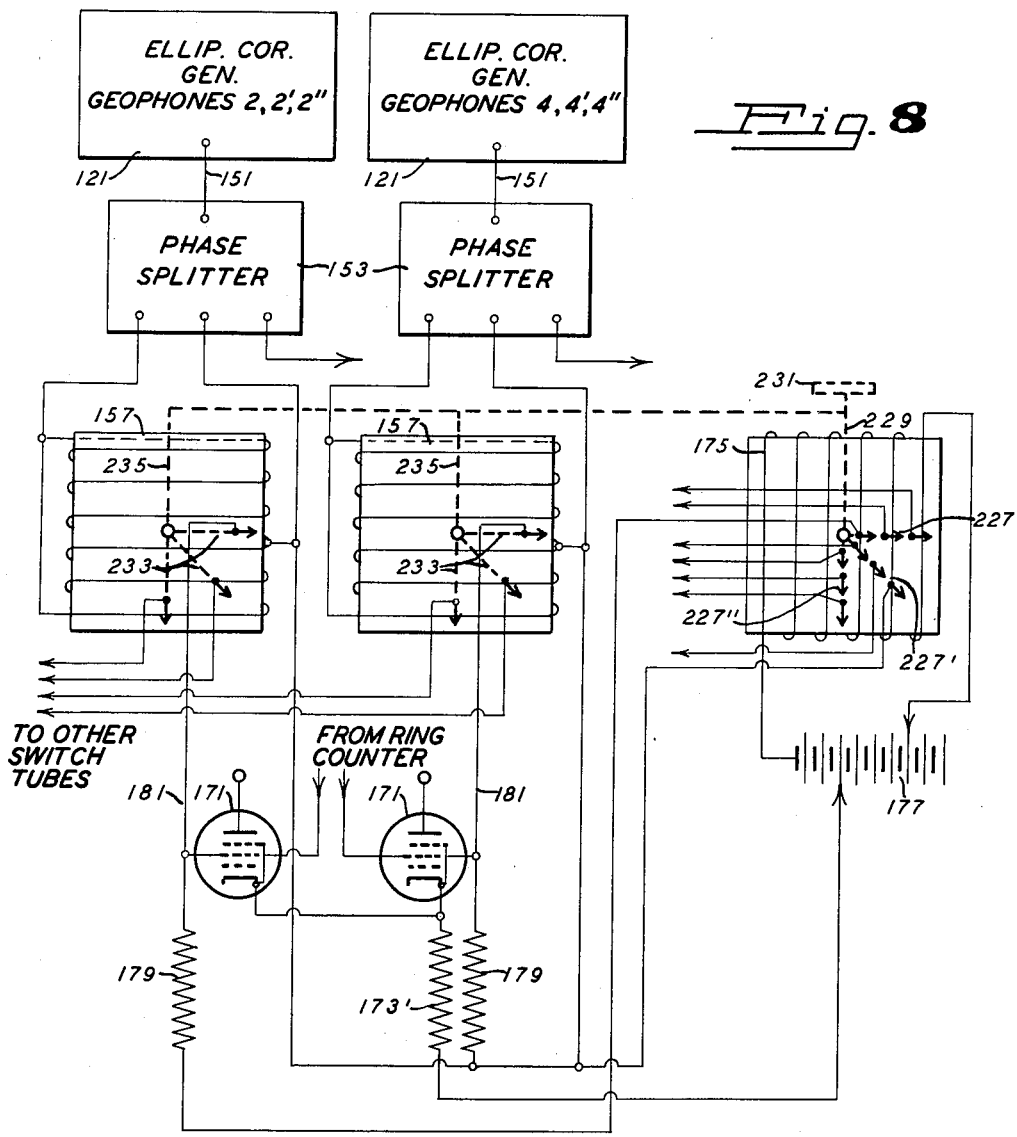

United States Patent Office 2,756,836
Patented July 31, 1956

2,756,836
GEOPHYSICAL DISPLAY APPARATUS

Frank Rieber, deceased, late of New York, N. Y., by Lu Garda Rieber, executrix, New York, N. Y., assignor to Geovision Incorporated, a corporation of New York Continuation of application Serial No. 65,883, December 17, 1948. This application October 22, 1952, Serial No. 316,136

22 Claims. (Cl. 181—.5)

This invention relates to apparatus for displaying the data derived in seismic geophysical exploration in a manner approximating a space model of the geological mass being explored or, at least, a section therethrough. The invention is an improvement on and development of the devices shown in the applicant's co-pending application Serial Number 53,954, filed October 11, 1948, for a Method of and Apparatus for Displaying Geophysical Data, now U. S. Patent No. 2,693,862, granted November 9, 1954, this application being a continuation of abandoned application Serial No. 65,883.

In the method of display under consideration a train of seismic waves is set up in the mass to be explored, usually by the detonation of a charge of explosive at a "shot point." The wavefronts so generated travel radially outward from the shot point in a constantly expanding quasi-hemispherical surface. Where the wavefront strikes a reflecting surface, i. e., any interface between the material through which it has been traveling and a material of different density, rigidity, or both, it will be reflected, and the reflected waves can be picked up by receptors or geophones disposed in an array about the shot point.

The velocity of propagation of the waves through the earth may be determined by timing the arrival of the wave resulting from the initial explosion at the various geophones. If it be assumed that the velocity is a constant, the distance that any reflected wavefront has traveled from the shot point to the point of reception can be determined by multiplying the known velocity by the interval between the instant of explosion and the instant of arrival of the wave at the geophone.

The interval mentioned, when considered in connection with one geophone only, tells nothing of the direction or disposition of the surface from which the reflection occurred; it gives only the sum of the distances travelled to and from the reflecting surface. This, however, defines the locus of the reflecting surface; it is somewhere tangent to an ellipsoid of revolution with the shot point and the receptor point as the foci, and the projection of the locus upon any selected plane within the earth (hereinafter referred to as the "picture plane") will be an ellipse or, in certain special cases, a circle.

In general, the arrival time of a wave reflected from any specific interface will be different for each receptor. In general, too, the various ellipsoidal loci will have different eccentricities and different centers. If the picture plane be correctly chosen, preferably perpendicular to the reflecting surface, the loci corresponding to the different geophones but with respect to the same reflecting surface will reinforce, and a large number of such reinforcements will clearly define the position and attitude as well as the distance of that surface.

In the system of display involved in both this and the previously-mentioned application a display surface is used on which are generated expanding families of quasi-circular loci corresponding to the positions of possible reflecting surfaces within the earth with respect to a plurality of geophones and these loci are modulated in intensity in accordance with the instantaneous amplitudes of the seismic waves as received by the respective geophones, thus representing, to scale, the projection of the actual loci within the earth upon the picture plane.

In the prior application referred to the means disclosed for generating the loci upon the display surface was a multi-gun cathode ray tube, each of the electron guns of the tube being modulated by electrical potentials corresponding to the waves as picked up by a specific geophone. In accordance with the present invention only a single means, such as a single electron gun, is used to generate the loci corresponding to all of the geophones used, loci representative of successive geophones being successively traced, and each locus being modulated in intensity by sampling the output of the corresponding geophone. The periodicity of the seismic waves which are principally valuable in seismic exploration is relatively low; say from 25 to 200 cycles per second. The rate of generation of the various loci is very much higher, so that the output of each geophone will be sampled and the corresponding locus modulated a number of times in each cycle of the seismic wave. Preferably, the seismic waves are not utilized directly, but are recorded in a phonographically reproducible manner as has been disclosed in the applicant's prior Patent No. 2,051,153 in order to produce a plurality of parallel recordings, and the sampling is done by scanning these recordings laterally while progressing along the record.

Among the objects of this invention are to provide a means of displaying seismic data in accordance with the general method above set forth which uses a single locus-generating and modulating system and is therefore not subject to inequalities introduced by elements which may not be identical; to provide apparatus which is capable of handling an indefinitely large number of geophone pickups; to provide apparatus usable with standard cathode ray tubes, thus dispensing with specially constructed equipment and making replacements easier; to provide apparatus in which the seismic data may be repeatedly scanned, either at the same rate or at a higher rate than that of their initial reception, and, during the scansion, data may be introduced into the system, such data corresponding to known or assumed geological differences; to provide means whereby these data may be modified and their effect in producing a coherent picture evaluated; to provide means of varying the azimuth of the picture plane; and to provide equipment for generating electrical quantities which are functions of the data to be introduced and applying them to achieve the desired results.

Other objects and advantages of the invention will be noted in connection with the following description, supplemented by the drawings, wherein:

Fig. 2 is a circuit diagram of a recording system in accordance with the present invention;

Figure 7:
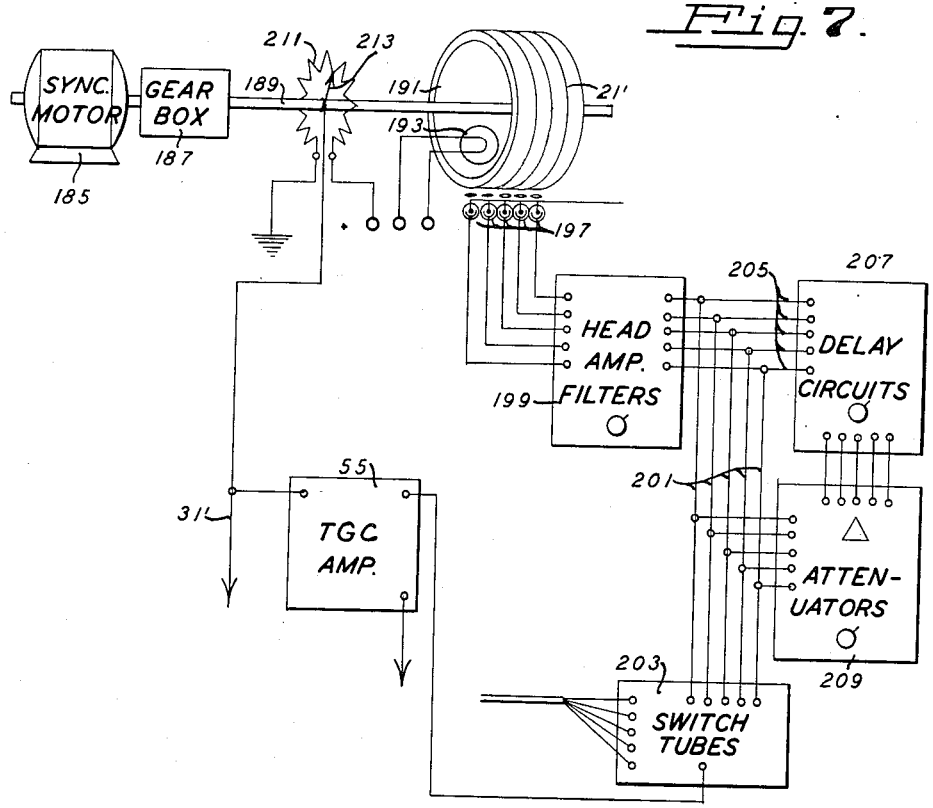
Figure 6:
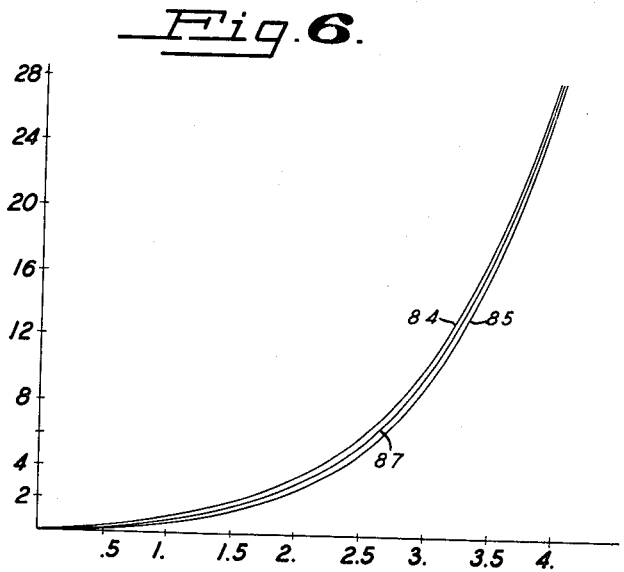

Fig. 6 comprises graphs relating to variation of the velocity of seismic waves with depth within the earth;

Fig. 7 is a diagram of a different form of scanning system which may be substituted for that shown in Fig. 2; and Fig. 8 is a diagram of ganging means for simultaneously varying electrical quantities introduced into the system.

Figure 1:
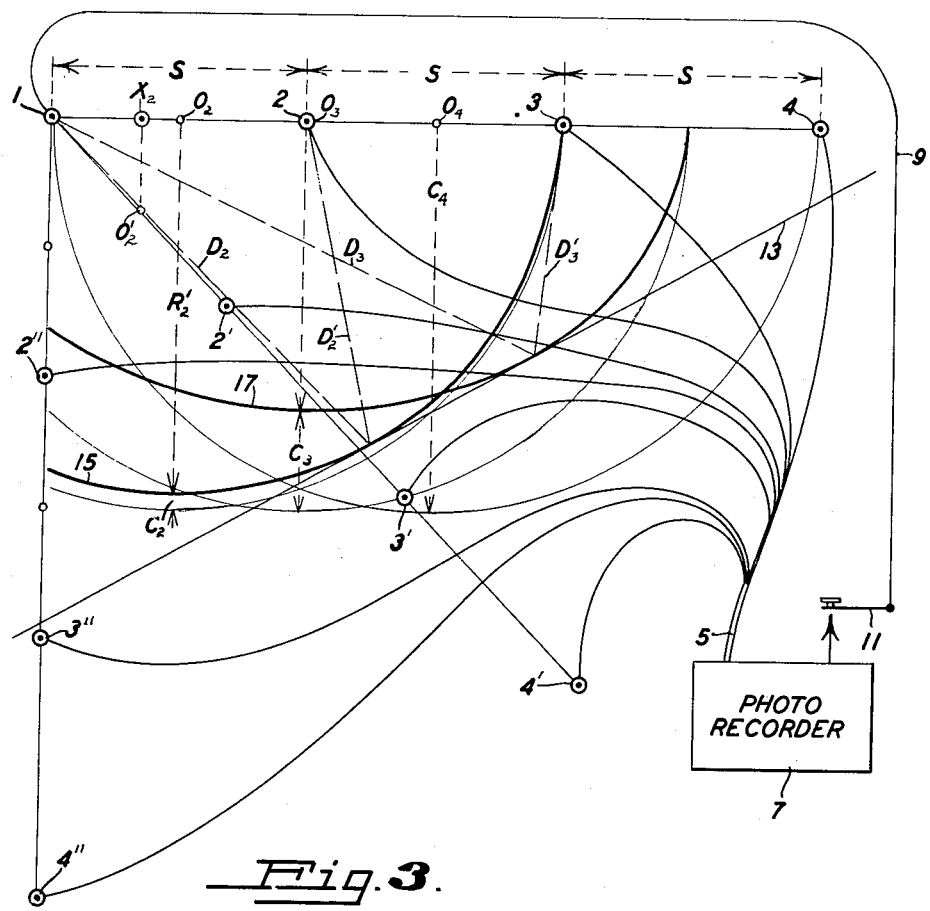
Fig. 1 is a schematic layout of a plurality of geophones with respect to a shot point and a recording system.

Fig. 1 is a diagram of a portion of an area to be explored by means of the system of this invention, showing a shot point 1 about which is disposed an array of geophones, which, in this case, are indicated as symmetrically placed about the shot point on lines radiating therefrom. Geophones 2, 2' and 2" are disposed at a distance $s$ from the shot point; geophones 3, 3' and 3" at a distance of $2s$; and geophones 4, 4' and 4" at a distance of $3s$ from the shot point. A cable 5 has branches leading to each of the geophones, which connect to individual phonographic recorders as indicated generally by the reference character 7.

A firing line 9 leads from the recording position to the shot point, the explosion taking place when a key 11 is depressed, and this marks, on all of the records, the instant of firing.

Assuming that the surface layer in which the explosion takes place is homogeneous, the initial wavefront generated by the explosion at 1 will travel outwardly hemispherically at a constant velocity $V_0$, reaching the geophones 2, 2' and 2" at an instant $t_2$, geophones 3, 3' and 3" at an instant $t_3=2t_2$, and geophones 4, 4' and 4" at an instant $t_4=3t_2$.

Prior to the instant $t_4$ it is obvious that no reflected wave can reach geophone 4, but any reflecting surface, say a vertical out-crop lying along the line 13, in a position such that the sum of its distances from the shot point and either of the geophones 2 or 3, will return a reflection to the geophones at this instant. This is indicated on the figure, where it can be determined, by measurement, that the sum of the distances $D_2$, from the shot point 1 to the out-crop 13 and $D'_2$ from the out-crop to the geophone 2 is equal to $3s$. The same is true of the distances $D_3$ and $D'_3$.

The locus of points in a plane the sum of whose distances from two fixed points is a constant, is an ellipse; in space it is an ellipsoid of revolution. The elliptical arcs 15 and 17 indicate the loci on the surface of the ground of all possible reflecting surfaces within those arcs which would return reflections to the geophones 2 and 3, respectively, at the instant $t_4$. These ellipses may be considered as the traces upon the ground surface of ellipsoids of revolution defining the loci of other strata which would similarly return reflections to these geophones at the instant $t_4$. Similar loci could be traced for each of the other geophones in the array, and at the instant $t_4$ the loci erected around the points 1 and 2' and 1 and 2" would have the same shape as the ellipse 15, while those erected around 3' and 3" would have the shape of the ellipse 17.

It is the purpose of the apparatus of this invention to trace upon a display screen loci representing to scale the projection upon the picture plane of the loci which would return reflections to each of the geophones of the array as successive instants. The preferred type of display surface is the screen of the cathode ray tube. The problem is therefore to project upon this screen curves of the proper form.

It is well known that the beam of a cathode ray tube may be deflected in a quasi-circular path by applying to its deflecting means (deflecting plates or coils) sine and cosine components of a harmonic deflecting wave. If the amplitudes of the deflecting components are equal, the figure traced will be a circle, while if unequal it will be an ellipse.

Using the circular method of deflection the points of origin of the loci are not the foci themselves, but the centers of the ellipses, half way between the shot point and the various geophones. These centers, which are better referred to as origins in view of what follows, are indicated on the diagram as $O_2$, $O_3$, etc., the subscript referring to the particular geophone to which the origin relates. In setting up the equipment the "spot" of the cathode ray tube must first be centered at the point corresponding to the projecion of the origin on the picture plane.

One way of treating an ellipse is in terms of its circumscribed and inscribed circles; the major radius of the ellipse is equal to the radius of its circumscribed circle. The minor radius is equal to the radius of its inscribed circle. The major radii of the ellipses drawn about the respective origins are directly proportional to time. If the harmonic deflecting components are proportional, respectively, to the major and minor axes, the proper loci will be traced. One convenient way of obtaining this proportionality is by generating sine and cosine deflecting potentials which are originally equal, and applying thereto correcting factors. These will be themselves sine and cosine components, respectively, but reversed in phase with respect to the primary deflecting components. It can be shown that the relationship between the radius R of the circumscribed circle and the radius R' of the inscribed circle can be expressed by the equation $$R' = R\sqrt{1-\frac{t_n^2}{t^2}}$$

where $t_n$ is the time required for the wave front from the shot point to reach the geophone under consideration (i. e. the reciprocal of the wave velocity times the direct distance from the shot point to a geophone) and $t$ is equal to the total elapsed time between the instant of the shot and the instant of arrival of the reflected wave at the geophone. The subtractive correction to be applied to R is the quantity $$R\sqrt{1-\frac{-t_n^2}{t^2}}$$

As will be seen, where $t_n$ is greater than $t$, this is imaginary, as it should be since no reflection can be received by a geophone from a surface between it and the shot point. Where $t_n=t$, the correction is unity times R; the ellipse has its limiting value of a straight line. At this instant the correction has its maximum value, not only relatively, but absolutely, and it falls off very rapidly as the ratio $t/t_n$ increases; thus, where $t=5t_n$ the correction factor has fallen to 2% of its relative value at $t=t_n$, and 10% of its actual maximum value.

These relations are indicated graphically in Fig. 1. For the ellipse 15, centered on $O_2$, the difference between the minor radius $R'_2$ of the ellipse 15 and the radius of its circumscribed circle is the small quantity $C_2$. For the ellipse 17, centered on $O_3$ (which happens to coincide with the position of the geophone 2), the correction is a much larger quantity $C_3$, the minor radius of the ellipse being $R'_3$. For the geophone 4, centered at $O_4$, the correction is equal to the radius of the circumscribed circle.

Where the picture plane lies upon the line passing through both shot point and geophone, the correction is applied to the sine function (vertical deflection) only, and not to the cosine. Where, however, the picture plane passes through a line making an angle with the line joining shot point and geophone, a correction must be applied to both the centering of the spot and to the cosine component of the locus. Thus, with the picture plane that has been considered passing through the shot point 1 and geophone 2, 3, etc., the position of geophone 2' would be projected upon the picture plane at a point between $O_2$ and $O_3$, and its corresponding origin $O'_2$ would be projected on the ground line at the point $X_2$ at a distance from the shot proportional to ½ S cos θ. In this case the correction to be applied to the cosine (horizontal) deflecting component is sin θ times the magnitude of the correction applied to the sine component, θ being the angle between the picture plane and the line 1—2'. In the case of the geophones 2'', 3'', etc., their projections as well as the projections of the corresponding origins would fall over the shot point 1, the corrections applied to the cosine deflecting components equal those applied to the sine components, and the loci appear as circles.

As has already been shown in the inventor's co-pending application above referred to, further corrections are necessary if the velocity of the wavefronts is not a constant, but varies with depth, as is usually the case. One assumption that is frequently made is that the velocity of the wavefront varies linearly with depth, or, at least, in a direction related to depth. If this relationship is the true one, it is there shown that (disregarding, for the moment, the elliptical correction) the loci can be expressed by the equations $$D = \frac{V_0 \sinh kt}{k} \text{ and } Z = \frac{V_0 \cosh kt - 1}{k}$$

where D is the instantaneous value of the radius of the locus, $V_0$ is the velocity at the surface, k is a constant of proportionality representing the increase of the velocity with time, and Z is a vector representing a displacement of the locus centers in the direction of the velocity gradient. These corrections can be superimposed upon the elliptical corrections with negligible error in the actual position of the loci, particularly as the elliptical corrections become vanishingly small so quickly. Unlike the elliptical corrections, they affect all of the loci in the same sense and therefore can be applied to all of the deflections simultaneously.

As indicated above, the intent of this invention is to provide a system which will sample successively the seismic waves picked up by each of the geophones in an extensive array, and during the period of sampling will trace the appropriate locus corresponding to the instant of sampling and modulated with the instantaneous intensity of the wave sampled. A preferred method of display is a single cathode ray tube which may be of the type which is used in television practice, but other methods of television scanning can be used. To do this tracing and sampling, the following steps are to be accomplished:

1. Provide voltages representative of the instantaneous amplitude of the seismic waves received by the respective geophones at the instant of sampling;
2. Switch the voltages successively to the intensity grid of the cathode ray tube;
3. Provide voltages which will center the beam on the origins of the respective loci;
4. Switch the latter voltages onto the deflecting means, vertical and horizontal, of the cathode ray tube, simultaneously with the switching of the geophone voltages;
5. Generate the sine and cosine components of the circular deflecting voltages;
6. Modulate these components as a function of time;
7. Generate the proper elliptical corrections;
8. Switch the elliptical correcting voltages onto the deflecting plates coincidentally with the sampling and spot positioning voltages; and
9. Permit the repeated rescanning of the records (where photographic recordings are used and not direct pickup) while adjusting the variable factors of the system so that the picture plane, the time functions, and other variables of the system may be so selected as to bring out the most coherent picture.

A schematic diagram of the preferred form of equipment for accomplishing the above functions is illustrated in Fig. 2. Although, as has been mentioned, the device can be used by direct pickup from the geophone circuits, without the intermediate recording step, its general usefulness is greatly increased where phonographically reproducible recordings are used. Methods of making such recordings are described in the applicant's prior Patents Numbers 2,051,153 and 2,144,812, which describe, as a preferred method of recording, variable density sound tracks made on photographic film. Up to twelve tracks of this character can be made on standard 35 mm. motion picture film, but it is preferred to use strips of wider film which will accommodate a larger number of tracks. As the maximum length of time over which the reflections from a single seismic shock can be recorded satisfactorily with present methods is four to six seconds, and as it is rarely that frequencies of over 200 cycles per second need be considered, not more than 1,000 cycles of the highest frequencies used need be analyzed on any one track, and these can be recorded on a relatively short length of film.

Tracks are preferably arranged side by side, and with a narrow guard band, which may be either unexposed or exposed to full density, between them. The inventor has successfully recorded as many as 25 such records on a single film. Composite records can, however, be made, by adjusting a plurality of such films side by side, and there is no absolute limit to the number of records that can be sampled, although it will be evident that with increasing number of records complexity of the apparatus increases.

The reference character 21 in Fig. 2 indicates a frame carrying a plurality of records of the type described, and in the present instance these are scanned by the "flying spot" method, the spot being generated by a cathode ray beam upon the fluorescent screen of a cathode ray tube 23. Where this method of scanning is used, the time base is generated by a saw-tooth oscillator 25, which develops an electrical potential varying linearly with time over a period corresponding to the length of the recordings and then repeats. The period of the oscillator 25 may, if desired, be the four or five second period actually used in recording, or it may be some other period having a known relation thereto; in general, however, it is desirable that the period be shorter, so that the entire group of records can be scanned in an interval within the combined persistence of the display screen and of vision.

A potentiometer 27 is provided which takes off of the oscillator output the proper value of voltage, which is applied to the vertical deflecting plates 29, through leads 31 and 33, to give the necessary vertical deflection to the beam and produce a pattern which is of the same shape (though not necessarily the same size) as the group of records 21.

At the same time as the vertical deflection, a horizontal deflection is provided from a saw-tooth oscillator 35. The oscillator 35 works at a frequency much higher than that of oscillator 25. It is synchronized from a master oscillator 37, as will be described later, and it scans across all of the records in the frame 21 at a rate rapid enough to sample the highest frequencies thereon several times in each wavelength. A horizontal deflecting potential is taken off from the oscillator 35 by means of a potentiometer 39 and fed to the deflecting plates 41 through lead 43 and ground, the potentiometer 39 being so set that the amplitude of horizontal deflection is to the amplitude of vertical deflection in the same ratio as the width to the length of the group of records 21.

Leads also connect from the potentiometers 27 and 39 to a blanking pulse generator 45. This generates pulses which, during the fly-back time of both vertical and horizontal generators, impose a negative pulse on the grid of the cathode ray tube 23, which cause the extinction of the cathode ray beam during the fly-back period. This technique is well known in the television art and will not be further elaborated.

An image of the field 47 which is traced by the cathode ray beam is focused upon the records 21 by a suitable optical system symbolized by lens 49. The image of the flying spot therefore scans the records transversely of their length and illuminates each record for a period of time proportional to the ratio of the width of a single record to the width of all of the records combined. The light emitted from the flying spot is a constant, and is modulated by the density of the film records. A second optical system 51 focuses an image of the record group 21 upon the photosensitive cathode of a photoelectric cell 53, which therefore passes currents proportional to the instantaneous value of illumination reaching the cell. In this case, therefore, the first switching operation mentioned above is accomplished optically; a modification using electronic switching will be described below, in connection with Fig. 7.

The output of photocell 53, after preamplification by a head amplifier 54, is passed into a time gain control amplifier 55 which increases the amplification as a function of time. It is customary to use time gain controls in the original recording to compensate for the attenuation of the seismic waves in the earth and make recordings from deeper reflections of substantially the same amplitude as those returning from nearer to the geophones. The output of photocell 53, however, is to be used to modulate the various loci. The luminescent screens used for these displays, as seen by the eye, generate the same amount of light in the same amount of time, other things being equal.

The radii of the loci are constantly increasing, and each locus is generated in a substantially equal period of time. Therefore, the apparent intensity of the locus, as defined by the light emitted from unit area, will be inversely proportional to the speed at which it is scanned. It is desirable that all loci subject to equal modulation shall appear to be of equal intensity, and the time gain control amplifier 55 increases the amplification with time in order to accomplish this. The control voltage for this purpose may be taken off from the lead 31 through a lead 57.

The amplifier 55 is connected through a lead 63 and ground to the grid and cathode, respectively, of the final projection tube 65. This provides the means for generating and modulating the signals representative of samplings of the seismic wave. The remaining equipment is devoted to generating the scanning frequencies and modulating and applying them so as to define the appropriate loci.

The master oscillator 37 above mentioned is designed to produce a pure sine wave of a frequency which is, for instance, related to that of the horizontal oscillator 35 by a factor of $n+a$, where $n$ is the number of records to be scanned and $a$ is a small integral number, perhaps 1 or 2. Oscillator 37 feeds a voltage divider 67, from which a switch 69 selects a potential dependent on the scale factor desired for the display on the screen 71 of the cathode ray tube 65. Switch 69 connects to a potentiometer 73 and the potentiometer arm 75 is adjusted along the potentiometer to a position which makes the voltage available at the potentiometer arm proportional to the known initial velocity $V_0$ of the seismic waves. Voltage $V_0$ is fed to modulators 77 and 79 as the "carrier" frequency to be modulated thereby.

The potentials to be modulated upon the carrier are proportional to the functions $\sinh kt$ and $\cosh kt - 1$, and are developed by generators 81 and 83 which receive a potential proportional to $t$ from the vertical generator 25.

In the applicant's prior application, Serial No. 53,954, above referred to, the function $t$ was developed mechanically, and the functions $\sinh kt$ and $\cosh kt - 1$ were produced and modulated upon the carrier by means of cam driven potentiometers. The same system could be used here, but it is preferred to develop these functions electronically. This can be done in a variety of ways. The function $\sinh kt$ is equal to one-half the difference of two exponential functions, $e^{kt}$ and $e^{-kt}$. $\cosh kt$ is equal to one-half the sum of these functions. It is known that the voltage across certain contact rectifiers, such as copper oxide rectifiers or germanium crystal rectifiers, varies exponentially with the current therethrough through a very wide range. These functions can therefore be developed and added or subtracted to produce the sinh and cosh − 1 functions, or these functions may be developed in the method later to be described for generating the elliptical correction. For the purposes of this application it is unimportant which of the various methods available are utilized to develop the functions, and since the methods of developing them are well known in the electronic computer art they are merely indicated here and not shown in detail.

As is shown in Fig. 6, the functions $\sinh kt$ (curve 84) and $\cosh kt - 1$ (curve 85) are very nearly the same shape. $\sinh kt$ and $\cosh kt$ differ by the quantity $e^{-kt}$ which, at time 0, is unity, but which quickly drops to a very small quantity. The quantity $$\frac{e^{+kt}-1}{2}$$

is the mean value of the two functions, and is shown as curve 87 of Fig. 6. For certain applications, therefore, it is sufficiently accurate to generate this single function, as it can be seen, from the formula given above, this will result in no error in the vertical scanning displacement and only a very slight error in the horizontal one. If this is sufficiently accurate for the purposes at hand, the two generators 81 and 83 can be combined, but it is preferred to use the more accurate separate generators.

The quantity which varies most widely in geophysical exploration is the quantity $k$. This is introduced into the generators 81 and 83 by the "$k$ adjustor" 91. If the contact rectifier method of generating the exponential functions is used, this adjustor regulates the current which develops the function, by regulating the gain of a vacuum tube, a potentiometer adjustment, or otherwise. It also adjusts, mechanically, the gain of two variable gain amplifiers 93 and 95, connected to the output circuits of the modulators 77 and 79, respectively, to a value proportional to $1/k$. The outputs of these amplifiers are therefore proportional, respectively, to the radii of the various loci as they change with change in time, and to the vector displacement of the centers of the loci from their origins.

The output from variable gain amplifier 93 is divided and passes through phase splitting circuits 97 and 99, the former of which delays the output phase by 45 degrees and applies the voltage thus generated across an arm 101 of a resistive summing network which is connected across the vertical deflecting plates 103 of the display tube 65. The other network 99 advances the phase of the output of amplifier 93 by 45 degrees, applying the resultant potential across arm 105 of a second summing network and thence across horizontal deflecting plates 107 of the display tube. It will be recognized, of course, that a single resistive-capacitive or resistive-inductive phase splitter could be used, and the voltages applied to the vertical and horizontal plates, but as there are always some losses in even the best condensers the resultant phase splitting is always slightly under 90 degrees and it is therefore preferred to use the 45 degree method which can be adjusted exactly to make the sine and cosine phase components equal. One of the various forms of resolver could be used as well.

The output of variable gain amplifier 95 is fed to a resolver 109, having crossed secondaries which pick up voltages which are proportional, respectively, to the sine and cosine of the angle $\alpha$ between the direction of the velocity gradient and the horizontal. The sine function is fed to a rectifier network 111 and the rectified voltage is applied to arm 113 of the vertical summing network. The cosine component is applied to a phase-sensitive rectifier 115 and the rectified component is fed to arm 117 of the horizontal summing network. If the direction of the velocity gradient is vertical the displacement of the locus centers will also be vertical and the cosine component, applied to the horizontal deflecting plates 107, will be zero. If, however, the velocity gradient is not vertical, the center may be displaced horizontally in either direction, thus requiring the use of the phase-sensitive rectifier. The vertical component of the gradient vector is always downward, and hence phase rectification is not necessary for the sine component.

Figure 3:
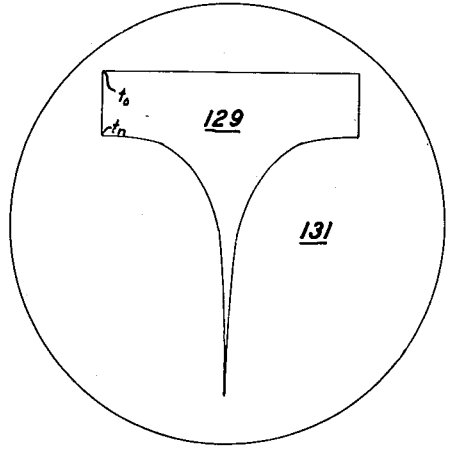
Fig. 3 is a drawing of a mask for a cathode ray screen as used for developing the corrections required to convert an expanding circular cathode ray pattern into a family of ellipses.

There remains to be described the equipment used for developing the elliptical correction potentials and for switching these and the spot positioning potentials at the origins. Various methods are available for generating the elliptical correction factor; a preferred method is illustrated in Figs. 3 and 4, taken in connection with Fig. 2.

Fig. 2 shows a lead 119 taken from the output of the master oscillator 37 and leading to elliptical correction generators 121. A separate elliptical correction generator is required for each distance between shot point and receptor. Thus, for example, separate correction generators of this type are necessary for geophones 2, 3 and 4, but the same generator can be used to develop the corrections for geophones 2, 2' and 2", and for any additional geophones which may be at an equal distance from the shot point 1. For this reason, as well as because of the advantage to be obtained in rotating the picture plane in azimuth, it is desirable to set up the receptor array symmetrically about the shot point, or at least with numbers of geophones at equal distances from it. There will, of course, be cases where this is not possible and additional elliptical correctors may be provided for non-symmetrical points. Problems of instrumentation, however, indicate that such asymmetrical points should be kept to a minimum.

Figure 4:
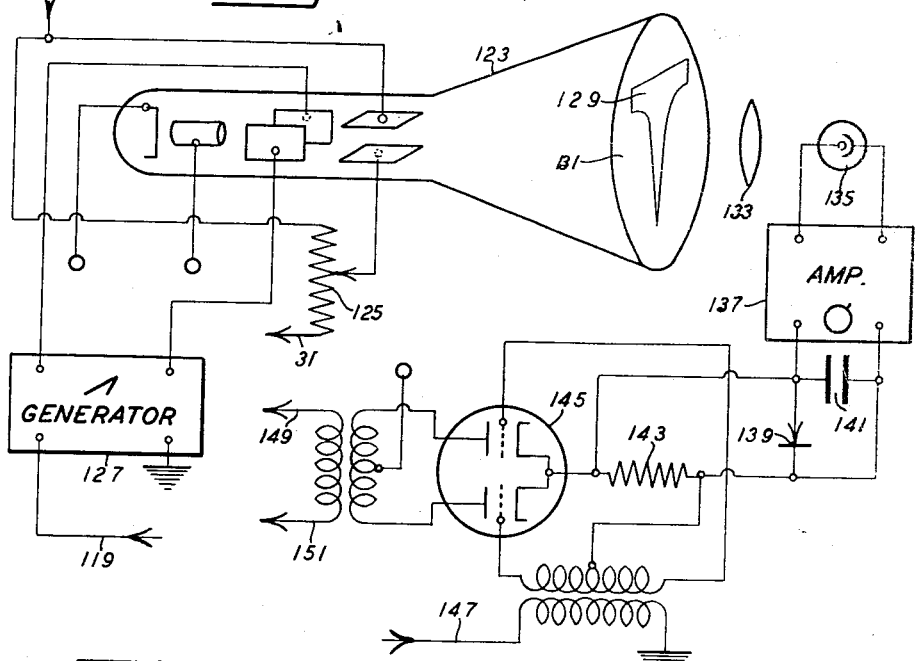
Fig. 4 is a circuit diagram of the cathode ray tube and circuits as used for the above purpose.

The correction generator illustrated in Fig. 4 comprises a cathode ray tube 123 which utilizes a beam of constant intensity. This beam is deflected vertically by a potential derived from lead 31 from the vertical oscillator 25 which generates the timing axis for all of the tubes. A proportion of this potential is utilized which can be adjusted by means of a potentiometer 125. The horizontal deflecting voltage is generated by sawtooth oscillator 127, which is synchronized with the master oscillator by the potential applied through the lead 119. Horizontal deflection is of a fixed value, which is equal to the maximum width of an aperture 129 in a diaphragm or shield 131 which covers the face of the tube 123. The screen should be of the instantaneous response variety, with minimum lag. Considering the shape of the aperture 129, if its width at the ordinate $t_n$ (Fig. 3) be taken as unity, its width at other ordinates between $t_n$ and the bottom of the figure are proportional to the elliptical correction $$1 - \sqrt{1 - \frac{t_n^2}{t^2}}$$

Potentiometer 125 is so set that the rate of vertical deflection will carry the beam through the distance $t_0$ to $t_n$ in the time required for the wave to reach the geophone or group of geophones to whose output the correction is to be applied. Since the horizontal deflection is at a uniform rate the integrated illumination of the screen over each cycle of deflection will be proportional to the width of the opening in the diaphragm. The image of the screen, as exposed through the diaphragm, is focused by an optical system 133 on the cathode of a photocell 135. The output of the photocell feeds an amplifier 137, and the amplified output feeds in turn a rectifier circuit comprising a rectifier 139, a condenser 141, and an output resistor 143.

The time constant of the circuit comprising resistor 143 and condenser 141 is adjusted to be several times greater than the period of the master oscillator 37, but shorter than the period of the horizontal oscillator 35. The output of the rectifier will therefore be proportional to the width of the diaphragm currently being scanned, but will vary rapidly enough so as not to integrate materially between successive samplings of its output.

Resistor 143 forms a cathode resistor of a conventional modulator, shown in this case as a double triode 145, normally biased to cutoff. A lead 147 supplies modulating current from the variable gain amplifier 93 of Fig. 2, which is applied to both grids in opposite phase. Current will be passed by the triode only to the degree that the rectified potential from amplifier 137 depresses the cathodes below cutoff, thus producing a modulated output in leads 149 and 151 which is proportional to the product of the elliptical correction and the deflecting voltage being applied to the tube. The gain of amplifier 137 is adjusted, preliminary to the use of the device for record analysis and as a part of the original setup of the equipment, so that when the spot is making its full sweep across the maximum width of the mask the modulated output bears a 1:1 ratio to the carrier voltage.

The output leads 151 from each of the correctors connect to phase splitters 153, generating sine and cosine components in the same manner as phase splitters 97 and 99. The sine component is fed directly to vertical switch tubes 155. The cosine component is fed to a "sine adjuster" 157, which comprises means for taking off a portion of the correction voltage proportional to the sine of the angle $\theta$ between the picture plane and the line between the shot point and the geophones concerned. One form of such adjuster will be described more fully below. Corrected outputs are passed to the horizontal switch tubes and spot adjusters 159.

The switch tubes are operated by pulses derived from the master oscillator 37. A branch from the lead 119 connects to a phase control and pulser 161, the phase control being utilized to bring the epoch of the pulses into the right phase so that switching will be accomplished in the portion of the deflecting cycle when the cathode ray beam is at the top of its sweep. There are many well known methods of developing the pulses, one being by a saturated core transformer. The pulses are fed to a ring counter 163, through a lead 165.

The ring counter comprises as many stages as are required for switching between the various tracks, plus at least one. The extra stage feeds pulses to the horizontal generator 35 and synchronizes it, but if the number of records scanned is large, and the fly-back time is long in comparison with the time required to scan one track of the record, additional stages may be used to delay the scanning while the oscillator "settles down."

Figure 5:
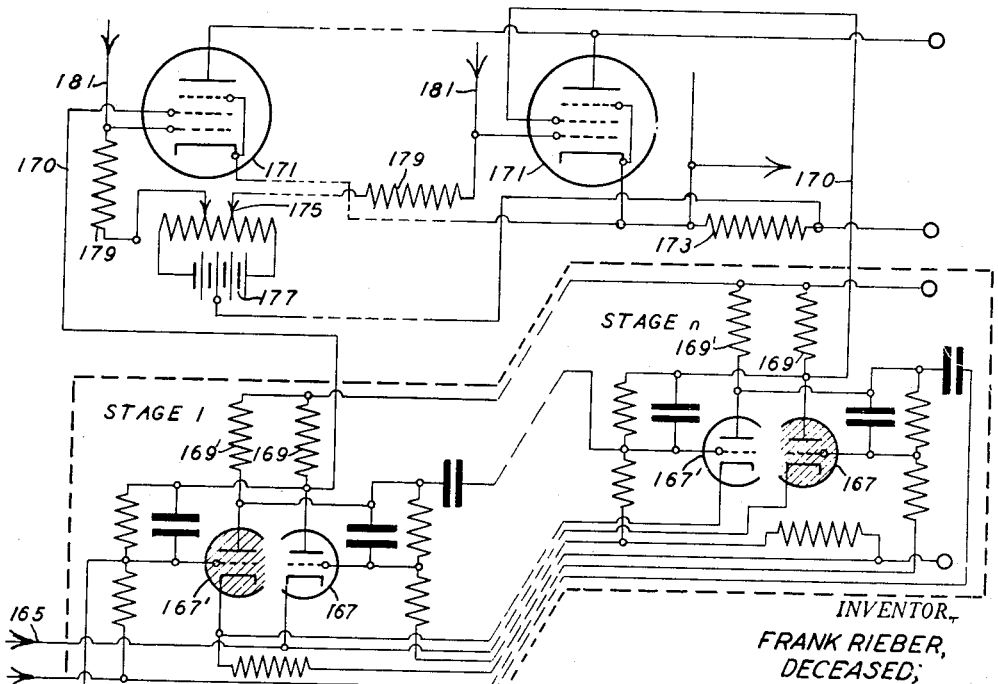
Fig. 5 is a circuit diagram of electronic switching mechanism for introducing into the deflecting circuits data corresponding to the position of the various receptors with relation to their corresponding loci.

In the diagram of Fig. 5 only two counter stages are shown, designated in the diagram as "Stage 1" and "Stage n." In this case Stage 1 is shown as feeding directly (through dotted connections) Stage n, but it is to be understood that as many stages as desired may be interposed between them, each stage feeding the succeeding stage in precisely the same manner. The description of Stage 1 may therefore be taken as descriptive of any stage. Stage 1 comprises an Eccles-Jordan "flip-flop" counting circuit consisting of a double triode 167—167'. Where more than two stages are involved tube 167 of each stage carries current the greater proportion of the time, triode 167' carrying current only when that stage is "flipped." The pulse supplied through lead 165 will "flop" Stage 1 (here shown flipped—counter tubes carrying current are shaded) and "flip" the succeeding stage. Only one of the triodes in each stage carries current at any one time.

Considering Stage 1, tube 167 is carrying no current, and therefore there is no potential drop in its plate resistor 169 due to current in this tube. When the next pulse arrives along lead 165, flopping the stage, there will be a large potential drop in the resistor 169, and zero drop in plate resistor 169'. The supply potential and the value of resistors 169 and 169' are so chosen that when the stage is flipped the voltage at the plate of tube 167 will apply proper screen grid potential through leads 170 to a switch tube 171, whereas when this stage is flopped the potential applied to the screen grid of the tube will be at or below its cathode potential, thus gating the tube.

Tube 171 in each stage is used to apply both the spot positioning potential and the elliptical correcting potential to the deflecting plates of tube 65. Each of these tubes is connected as a cathode follower, having a common cathode resistor 173. The tubes used are preferably pentodes, having as high a mutual conductance as is feasible, such as 6AC7's, and the resistor 173 is chosen to have as high a value as is conveniently possible; from 20,000 to 100,000 ohms. The cathode drop through this resistor will therefore carry these tubes nearly to cutoff. With a cathode follower connection of this type, the change in output voltage (at all values above cutoff) is substantially equal to the change in grid voltage. Grid voltage for each switch tube can be adjusted by the connection of the potentiometer arms 175 so as to derive the proper biasing potential from a battery or other source 177.

The circuit is adjusted, as will be later described, so that a positive value of plate current through the resistor 173 in excess of the self bias current is required properly to position all of the spots, i. e., so that the origins must all be moved in the same direction from an initial point where no spot positioning potential would be required, and some additional positioning current flows through each tube properly to place the spots at their respective origins. When thus biased the plate current can be modulated to develop the correcting voltages.

It should be noted that since the switch tubes are self-biased there may be some difference in cathode resistor drop before the voltages for positioning the spot are applied. Ordinarily these differences will be negligible, but if not they can be corrected by adding individual biasing means or by adjustment of screen grid voltage.

The elliptical correcting voltages are applied to the grids of the tubes from the elliptical correctors through leads 181, the correcting potentials appearing across the high-value grid resistors 179, through which the spot positioning potentials are applied to the respective grids. The cathode resistors 173 (in the case of the horizontal switch tube, designated as 173') form the final branches of the summing networks across the vertical and horizontal deflecting plates, respectively, of tube 65, the elliptical correcting voltage being applied out of phase with the main deflecting voltage since the sign of the correction is always negative.

The primary positioning voltage, to which the spot-positioning voltages are added, is applied to the plates in series with the summing network through leads 180, 180' taken off from the circuits on each side of bypass condensers 182, 182'.

In order to avoid confusion due to the deflection of the loci above the ground level, and, particularly, during the switching period, means are provided for suppressing deflections above this point, and causing the beam to trace a straight line at the value chosen for ground level. The means for this purpose comprise a diode 184 with a bias impressed upon its cathode by means of a potentiometer 186 and current source 183, the bias being of such value that the diode passes no current until the potential across plates 103 attains a positive value in excess of the bias. From this point any increase in voltage will cause current to pass the diode, which acts as an effective short, keeping the current at the constant "ground level" value.

As has already been indicated, the various elements entering into the combination comprising this invention can be greatly modified in detail and in physical method of operation. One such modification relating primarily to the method of scanning the phonographically reproducible records of seismic waves is shown diagrammatically in Fig. 7. In this case the scanning is done mechanically, instead of by means of the flying spot. The period of the repetitive scanning of the records is established by a synchronous motor 185 which may be driven by the ordinary 60 cycle A. C. supply. The rate of revolution of the motor is geared down through a gear box 187 so that a driven shaft 189 makes one revolution in the period over which it is desired that the scanning take place; either at the original scanning rate or at a higher rate as in the scanning method previously discussed. The multiple records 21' are wrapped around a transparent drum 191 mounted on the shaft 189.

An exciter lamp 193, mounted within the drum, illuminates all of the sound tracks, and the latter are provided with individual optical systems, including slit diaphragms, each focusing the portion of the track instantaneously being scanned on the cathode of its own photocell 197. The outputs of these photocells are individually amplified by a group of head amplifiers, and adjustable filters 199 for selecting from the waves the frequencies most useful for the geophysical analysis to be made.

Behind the head amplifier-filter system the photocell channels are each divided. One branch of these circuits, 201, leads to a group of switch tubes 203, which can be of the same type already described for switching the spot position and elliptical correcting potentials. The other branches 205 of the photocell channels are passed into a group of delay circuits 207, the purpose of which is to delay the waves for one-half period of the dominant frequency being analyzed. From there the channels lead into a group of attenuators 209, by which the amplitude of the waves are attenuated by a value substantially equal to their logarithmic decrements, after which the tube channels again unite with the corresponding leads 201, and so to the switch tubes. From the switch tubes the single output circuit passes to the time gain control amplifier 55, which is the same as that shown in Fig. 2, and from this point on the circuit is the same as has already been described.

In order to synchronize the deflecting circuits and provide the potential which varies as time, a circular potentiometer 211 surrounds the shaft 189. A direct potential is applied across the terminals of the potentiometer, which is swept by potentiometer arm 213 at each revolution of the shaft. The lead 31' connects to the shaft, and the potential between this lead and ground varies linearly so that it can be used for all of the same purposes as that developed between lead 31 and ground with respect to the remainder of the equipment shown in Fig. 2.

The switch tubes 203 are gated by the same pulses from the ring counter 163 as actuate switch tubes 155 and 159 in Fig. 2.

The primary advantage of the modification shown in Fig. 7 is that it permits the initial pulses of damped wave trains to be accentuated and the ensuing wave train to be suppressed in the manner described in the co-pending application, Serial Number 53,954. Furthermore, since the switching is electronic and not optical, the switching method can be used with the direct output of the geophones, as also described in the said co-pending application, without the intervention of the recording step.

Mention has been made of the advantage of being able to vary the various parameters of the system, during scansion, in order to obtain the clearest and most coherent picture of the structure being explored. The modified scanning system just described permits the "lambda-delta" correction to be varied in this manner. The factor $k$ can similarly be so varied, as can $V_0$, although the latter can usually be determined directly before analysis starts, making adjustment unnecessary.

Most important, however, is ability to vary the picture plane, the formations showing most clearly when this is normal to the strike of the strata. This can be done, of course, by individual adjustment of the quantities which determine it, but it is much more convenient, and it is easily possible, to gang the adjustments so as to vary them simultaneously in the proper proportion. One method of accomplishing this is shown in Fig. 8.

The quantities to be adjusted to rotate the picture plane in azimuth are (1) the spot positioning potentials for determining the origins of the loci, and (2) the horizontal elliptical corrections. The first of these varies as the cosine of the angle $\theta$ between the azimuth of the picture plane and that of the line joining the shot point and the individual receptor. The second, which is the proportion of the elliptical correction to be introduced into the horizontal deflecting voltage, is proportional to $\sin \theta$. The adjustments for these quantities are all indicated diagrammatically in Fig. 2; they are shown, still diagrammatically but more in detail, and with the mechanical linkages indicated, in Fig. 8.

The mechanism chosen for making the ganged adjustments are cosine and sine potentiometers of the rectangular card type; the potentiometer winding, consisting of many turns of fine wire closely spaced, is wound on a square or rectangular card. With the total potential to be divided applied across the terminals of the winding the potential gradient along the card then makes a very slight angle with the winding axis, which can be allowed for if necessary; with 500 turns of wire on a square card it is only about 11 minutes of arc.

Taking the potentiometer 175 of Fig. 5 as typical, the contact points for picking up the spot positioning potentials corresponding to each of the various geophones are carried by insulating arms 227, 227', 227'' mounted on a rotatable shaft 229 journaled perpendicular to the plane of the card approximately above its center. Each of the arms is shown as carrying three such contact points, those on arm 227 corresponding to geophones 2, 3 and 4 of Fig. 1. The arms may be angularly adjustable about the shaft, in order to provide for various receptor arrays, arm 227' being set at an angle with arm 227 corresponding with the angle of the line of geophones 2', 3', 4' with the line 2, 3, 4, and similarly with arm 227'' as to geophones 2'', 3'', 4''. Each contact point is adjustable along the arm to a distance from the shaft axis corresponding to the distance between the locus origin with reference to the respective geophone and the shot point. The potentiometer is therefore in the nature of a plot of the receptor array. The connections of only two of the contacts, corresponding to geophones 2 and 4 to their respective switch tubes, is shown.

If, now, the source 177 is connected to the switch tube cathode circuit at a point such that the undeflected spot corresponding to any of the geophones 2'', 3'', 4'' falls on the screen at the position of the shot point, and the total potential from the source applied to the winding is adjusted so that the spot corresponding to, say, geophone 4 also appears at the proper place on the screen, all of the other spot positions will be in correct relation, and will remain in such relation with respect to a picture plane rotated through an angle $\theta$ as the shaft is rotated through a like angle, as by the control knob 231.

The arrangement for applying the elliptical correction is similar, but differs in detail. Two of the correctors 121 are shown; those set so that their respective ratios $t_n/t$ corresponds to geophones 2, 2', 2'', and 4, 4', 4'', respectively. After passing through the phase splitters 153 the cosine phase component from each is fed to the sine adjustors 157. The latter differ from potentiometer 175 in that their winding axes are rotated, relatively, 90 degrees, and are center tapped, the potential from the phase splitter being applied across the two halves of the windings in parallel, and the potential gradients being in opposite directions. The arms 233 are adjustable in azimuth, but the positions of the contact points on the arms are not adjustable, since the magnitude of the elliptical correction is determined by the generators 121 and it is only the proportion thereof that is to be applied to the horizontal deflecting plates that is to be picked off by the potentiometers.

The potentiometer connections are dictated by the fact that while the portion of the correction to be applied is equal to the absolute value of $\sin \theta$, it is always a negative correction, and applied 180 degrees out of phase with the main deflecting potentials. The shafts 235 are preferably geared to shaft 229 and the adjusting knob 231, so that a single adjustment varies all the factors necessary for rotation of the picture plane.

It is obvious that with the adjustments described the picture plane will be rotated about an axis extending vertically through the shot point. This is perfectly general, however, since the projections of the loci on any parallel plane will be the same.

It will be apparent to those skilled in the art that the picture plane can be rotated around a horizontal axis, i. e., "haded" by applying like corrections to the vertical deflecting plates in a like manner. Except in rare cases this is not worth the additional complication it involves, and as the manner of accomplishing it is evident from what has already been shown, it need not be described in detail, it being sufficient to point out that the components to be applied are spot positioning direct potentials proportional to the shot point-origin distance times $\sin \theta$ times $\cos B$ (the angle of hade), and a cosine deflecting component proportional to $\sin \theta \cos B$ is also added. Adding the elliptical correction is seldom worth while, but it may be done in the same manner as in the horizontal component.

The reason for rotating the picture plane in either hade or azimuth is to bring it perpendicular to the plane of the strata being explored. This can always be done by rotation in azimuth, and only under special conditions by rotation in hade. The latter can be used so rarely that its added complication is not generally warranted.

It should be apparent that where phonographically reproducible records are used the directions of the high and low scanning frequencies can be interchanged, each sound track being scanned completely before passing on to the next, and the sampling being a sampling of the aggregate of sound tracks rather than successive samplings of the tracks of the aggregate. This system has several advantages; the lambda-delta correction can be used with flying spot scanning. The switching rate can be reduced to line frequency instead of element frequency, the fly-back of the vertical (high frequency) scanning oscillator being used to actuate the counter. Switching transients are also less troublesome, and the phase of the switching being less critical. Alternatively, the master oscillator frequency can be reduced to the transverse record-scanning frequency, and the loci themselves be "sampled" in synchronism with the sampling of the records. This results in each locus appearing as a series of dots instead of a complete line. Reinforcing loci appear as more nearly continuous lines in the arcs where reinforcement occurs, rather than as arcs of increased intensity. Some operators may find this presentation easier to read than the form now preferred.

The reason for preferring the element-by-element system, aside from its applicability to direct pickup without recording, is the decay of luminosity of the cathode ray tube screen. Coincidence and reinforcement of loci is most readily perceivable when they are of approximately the same brightness. Unless the strata of the area being explored are very sharply tilted indeed the loci corresponding to one stratum will have nearly equal radii and hence will appear of nearly equal brightness at the instant of observation. If all the loci relating to one geophone are generated before passing on to the next, they will have faded by the time coincidence occurs. This will do no harm if the screen is photographed, but makes direct observation more difficult.

There are various other modifications, refinements and combinations possible with the equipment above described which it seems unnecessary to consider in detail.

It should be obvious that the individual elements of the invention can be departed from widely without departure from the spirit of the invention. It is believed to be one of the advantages of the system as a whole that the techniques involved are, in general, those which have been fully developed in the television, radar, electronic computer and geophysical arts. These arts have provided substitutes for practically every element here described; where they have not, such substitutes can be found in co-pending applications and prior patents of the inventor.

Furthermore, the various methods of generating the functions here described can in many cases be interchanged; the method of generating the elliptical correction function can be used to generate the sinh kt and cosh kt functions, or functions corresponding to any other law of velocity variation than that here assumed. The elliptical correction functions themselves can be generated by tapered or loaded potentiometers to a sufficient degree of accuracy, particularly since they become small so rapidly; it has already been shown that by the time the quantity $t_n/t$ becomes equal to $1/5$, the correction amounts to but 2% of the minor radius of the ellipse. An error of 10% in this correction, therefore, involves only a 0.2% error in the minor radius, which is nearly the limit of resolution of the equipment. This is the primary advantage of applying subtractive corrections instead of modulating the main deflecting potential.

Mention has been made of loaded potentiometers. The potentiometers here described as such are all intended to be linear, but the substitution of equivalents for generating the various functions mentioned might result in their being loaded and in the distortion of their presumably linear curves. Where this would be the case the well known expedient can be employed of using buffer amplifiers, or, preferably, cathode follower tubes which have the very decided advantage of extremely high input impedance and substantial independence of minor variations in amplification factor. All of such expedients are well known to those skilled in the electronic arts, and it is therefore desired that the appended claims be construed as broadly as their terminology permits.

What is claimed is:

1. Apparatus for displaying seismic geophysical data as received from a plurality of receptors distributed in known pattern about a shot point, comprising means for sampling seismic data from each of said receptors successively within an interval short in comparison with the rate-of-change of the data sampled, means for translating said data into electrical potentials varying in accordance with the magnitude of the successive samples, and display means comprising a display screen, means for tracing on said screen a series of quasi-circular loci, each locus corresponding to scale with the locus of a possible reflecting surface within the earth which would reflect a seismic wave to arrive at a specific one of said receptors at an instant corresponding to the instant of sampling, and means for modulating said loci tracing means in accordance with said electrical potentials.

2. Apparatus in accordance with claim 1 wherein said display means comprises a cathode ray tube.

3. Apparatus in accordance wtih claim 1 wherein said display means comprises a cathode ray tube including said display screen and said means for tracing quasi-circular loci comprises, means for generating an electrical oscillation of a frequency corresponding to the sampling intervals, means for developing from said oscillation a derived oscillation varying with time, a phase splitter connected to resolve said oscillation into quadrature phase components, circuit connections for applying said components to deflect a beam of cathode rays in said tube in quasi-circular paths of expanding radii, and switching means synchronized with said sampling means for applying to said tube during each sampling interval a fixed potential, adapted to displace the origin of said quasi-circular paths to a position corresponding to scale with the mid-point between said shot point and the receptor whose output is being sampled.

4. Apparatus in accordance with claim 1 wherein said display means comprises a cathode ray tube including said display screen and said means for tracing quasi-circular loci comprises, means for generating an electrical oscillation of a frequency corresponding to the sampling intervals, means for developing from said oscillation a derived oscillation varying with time, a phase splitter connected to resolve said oscillation into quadrature phase components, circuit connections for applying said components to deflect a beam of cathode rays in said tube in quasi-circular paths of expanding radii, means for modulating a portion of said second oscillation in accordance with a correction factor representative of the differences between spherical surfaces and ellipsoidal surfaces representative of said reflecting surface loci at corresponding epochs, and switching means for applying quadrature components of said modulated oscillation to said cathode ray tube in algebraic addition to said deflection components.

5. Apparatus for displaying seismic geophysical data phonographically recorded as a plurality of parallel sound tracks, each representative of seismic waves received by a geophone in known position relative to a source of said waves, which comprises pickup means operative to translate the point-to-point variations of the recordings on all of said tracks into corresponding varying electrical potentials, means for scanning said tracks with said pickup means both longitudinally and transversely of said tracks at a relatively high rate of transverse scanning in comparison to the longitudinal rate so as to sample successively the recordings on each track a plurality of times in each period of waves recorded thereon, an electrical oscillator operative at a frequency at least as high as the transverse scanning frequency times the number of tracks, a display screen, means for producing visible traces on said screen, means actuated by said oscillator for deflecting the position of such traces bidimensionally over said screen to trace on said screen successive quasi-circular paths corresponding to scale with the loci of possible reflecting surfaces within the earth which would reflect a seismic wave recorded on a specific track at an instant corresponding to the instant of scanning thereof, and means for modulating the intensity of the traces produced by said tracing means in accordance with the electrical potentials developed in scanning the respective tracks.

6. Apparatus for displaying geophysical data phonographically recorded on a plurality of sound tracks comprising pickup means for said tracks, means for repetitively progressing the position on said tracks affecting said pickup means relatively to said tracks, means for successively sampling the amplitudes recorded on each of the tracks, a display screen, means for tracing on said screen repetitive successions of quasi-circular loci the radii whereof vary continuously as a function of time within each such succession, means for modifying the form of said loci in accordance with a factor common to all of said tracks, means for controlling said tracing means to vary the positions of successive loci as traced on said screen in accordance with factors individual to said tracks, means for applying said last-mentioned modifying factors to successively traced loci concurrently with the sampling of the tracks to which such modifications appertain, and means for modulating the intensity with which said loci are traced in accordance with the amplitude sampled from the corresponding tracks.

7. Apparatus in accordance with claim 6 including means for varying said individual modifying factors concurrently in accordance with a predetermined law.

8. Apparatus for displaying geophysical data derived from a plurality of geophones disposed in known geometrical position with relation to a shot point, comprising a display surface, means for forming on said surface a succession of quasi-circular traces representative of the projection on a picture plane of the loci of possible reflecting surfaces within the earth with respect to said shot point and said geophones generally, means for controlling said trace-forming means to establish the origins of successive traces on said display surface at positions in accordance with the geometrical relation between said shot point and successive individual geophones as projected on said picture plane, means for successively sampling signals corresponding to the output of said geophones concurrently with the formation of corresponding traces, and means for simultaneously varying said controlling means to shift the origins of said traces to positions corresponding to scale to the projections of said shot point and said geophones on a picture plane rotated with respect to said first mentioned picture plane.

9. Apparatus for displaying geophysical data derived from a plurality of geophones disposed in known geometrical positions with relation to a shot point, comprising a cathode ray tube having a luminescent screen and including means for directing a cathode ray beam against said screen and for deflecting said beam bidimensionally, means for generating quadrature deflecting fields for deflecting said beam over said screen in successive quasi-circular paths having radii varying as a function of time, a source of unidirectional electrical energy, voltage divider means for deriving from said source a plurality of potentials the ratios whereof correspond to the ratios of the distances of the individual geophones from said shot point times the cosines of the angles at said shot point between said geophones and a selected picture plane, and means for successively switching said derived potentials to said cathode ray tube to add a bias to one of said deflecting fields.

10. Apparatus in accordance with claim 9 including means for concurrently varying said derived potentials in accordance with angular changes in said picture plane.

11. Apparatus in accordance with claim 9 including means for concurrently varying said derived potentials in accordance with angular changes in azimuth of said picture plane.

12. Apparatus for displaying geophysical data derived from a plurality of geophones disposed in known geometrical positions with relation to a shot point, comprising a cathode ray tube having a luminescent target and including means for directing a beam of cathode rays against said target and for establishing fields of force for deflecting said beam bidimensionally, means for generating quadrature deflecting fields for deflecting said beam over said target in successive quasi-circular paths having radii varying as a first function of time, means for generating an electrical quantity varying as a second function of time, means for modulating said electrical quantity onto an electrical oscillation of the same frequency as said deflecting fields, and means for applying said modulated oscillation to at least one of said quadrature fields to add vectorially thereto.

13. Apparatus in accordance with claim 12 including means for applying said modulated oscillation to the other of said deflecting fields at a lower amplitude than that at which it is applied to said one field.

14. Apparatus in according with claim 12 including means for applying said modulated oscillation to the other of said deflecting fields and means for varying the amplitude at which said oscillation is applied to said other field in proportion to the sine of a selected angle.

15. The method of displaying geophysical data on a display screen which comprises the steps of generating a plurality of electric waves representative of said data, tracing on a display screen a plurality of families of loci, each family related to the data represented by one of said waves, and successively applying said waves to modulate the intensity of the loci of the related family.

16. The method in accordance with claim 15 which includes the steps of tracing at least part of each successive locus in a different family, and successively sampling said waves to modulate the related locus.

17. The method in accordance with claim 15 which includes the step of phonographically recording said geophysical data, electrically reproducing said data to generate said electric waves and cyclically repeating the processes of reproduction and locus generation.

18. The method in accordance with claim 15 which includes the step of phonographically recording said geophysical data, electrically reproducing said data to generate said electric waves and cyclically repeating the processes of reproduction and locus generation while varying the shape and position of said loci.

19. The method of displaying on a display surface geophysical data phonographically recorded as a plurality of parallel sound tracks having a common longitudinal time base, which comprises scanning said records longitudinally and laterally at different rates to generate electric waves representative of said data, generating on said surface traces corresponding to families of loci, each family related to an individual one of said sound tracks and each successive locus in one family corresponding to a successive interval of said time base, sampling said electric waves at intervals corresponding to the rate of traversal of successive sound tracks, and applying the sampled waves to modulate the intensity of the traces of the related loci.

20. Apparatus for displaying geophysical data on a display surface comprising a plurality of parallel sound tracks, each comprising a phonographically reproducible record of seismic waves received at a geophone at a known position with respect to a shot point, means for scanning said parallel records both longitudinally and laterally thereof, to produce electrical waves corresponding to the respective sound tracks, switching means for successively selecting the electrical waves corresponding to the seismic waves as recorded by successive geophones, means for tracing on said display surface a plurality of quasi-circular loci of radii increasing as a function of time as represented on said record, said loci being disposed in families about origins representative to scale of the positions of said geophones with respect to said shot point, means actuated by the selected electrical waves for modulating the traces of said loci in intensity in accordance with said selected waves, and means for coordinating said switching means to modulate the traces of corresponding loci with waves sampled from an individual sound track.

21. Apparatus for displaying geophysical data derived from a plurality of geophones disposed in known geometrical positions with relation to a shot point, comprising a display surface, means for forming on said surface a succession of quasi-circular traces representative of the projection on a picture plane of the loci of possible reflecting surfaces within the earth with respect to said shot point and said geophones generally, controlling means for varying the position of said quasi-circular traces, means for deriving a composite electrical signal the instantaneous values whereof are proportional in cyclic succession to the instantaneous amplitudes of the data derived from each of the respective geophones, means responsive to said signals for varying the intensity of the traces corresponding to the position of the respective geophone, and means for simultaneously varying said controlling means to shift the origins of said traces to positions corresponding to scale to the projections of said shot point and said geophones on a picture plane rotated with respect to said first picture plane.

22. The method of displaying seismic geophysical data on a display screen which comprises the steps of generating elastic waves in a geological mass to be explored, translating said waves into electric currents as they reach a plurality of locations known with respect to the point of origin of said waves, phonographically and separately recording said currents, electrically reproducing the currents thus recorded, tracing on the display screen families of loci representative to scale of the projection on a selected picture plane of possible surfaces which could reflect said waves to each of said locations at successive instants of elapsed time following the initial generation of said waves, causing said reproduced currents to vary the visual intensity of the traces representative of the loci corresponding to lapses of time equal to those between the generation of the recorded waves and the recording thereof, cyclically repeating the reproduction of said electrical currents and the tracing of said loci, and varying the shape and position of said traces to correspond to the projections of said loci on different picture planes.

References Cited in the file of this patent

UNITED STATES PATENTS

| | | |
|---|---|---|
| 2,088,297 | Koenig | July 27, 1937 |
| 2,243,729 | Ellis | May 27, 1941 |
| 2,243,730 | Ellis | May 27, 1941 |
| 2,287,413 | Bruce et al. | June 23, 1942 |
| 2,407,281 | Johnson et al. | Sept. 10, 1946 |
| 2,408,039 | Busignies | Sept. 24, 1946 |